(12) United States Patent
Wang et al.

(10) Patent No.: US 10,122,474 B1
(45) Date of Patent: Nov. 6, 2018

(54) COMMUNICATION SYSTEM FOR CASCADE TYPE POWER CONVERSION DEVICE

(71) Applicant: Delta Electronics (Shanghai) Co., Ltd., Shanghai (CN)

(72) Inventors: Kai Wang, Shanghai (CN); Daiping Zhou, Shanghai (CN); Yongqiang Lang, Shanghai (CN); Wenjiang Zhao, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 15/960,572

(22) Filed: Apr. 24, 2018

(30) Foreign Application Priority Data

Sep. 25, 2017 (CN) .......................... 2017 1 0874907

(51) Int. Cl.
| | | |
|---|---|---|
| *H04B 10/00* | (2013.01) | |
| *H04B 10/80* | (2013.01) | |
| *H02M 11/00* | (2006.01) | |
| *H02P 13/00* | (2006.01) | |
| *H02P 27/04* | (2016.01) | |

(52) U.S. Cl.
CPC .......... *H04B 10/801* (2013.01); *H02M 11/00* (2013.01); *H02P 27/04* (2013.01)

(58) Field of Classification Search
CPC .... H04B 10/80; H04B 10/801; H04B 10/802; H02P 13/00; H02P 13/06; H02P 13/08; H02P 13/10; H02P 13/12; H01F 38/16
See application file for complete search history.

(56) References Cited

U.S. PATENT DOCUMENTS

| | | | |
|---|---|---|---|
| 8,817,503 B2 * | 8/2014 | Inoue | H02M 1/08 363/127 |
| 9,214,871 B2 * | 12/2015 | Tsuchiya | H02M 7/49 |
| 2010/0213921 A1 * | 8/2010 | Abolhassani | H01F 27/385 323/328 |

* cited by examiner

*Primary Examiner* — Daniel Dobson
(74) *Attorney, Agent, or Firm* — CKC & Partners Co., Ltd.

(57) ABSTRACT

The present invention discloses a cascade type power conversion device and a communication system for the same. Each phase of the cascade type power conversion device comprises a plurality of power modules connected in series and a communication system. The communication system comprises a plurality of low voltage communication units and a plurality of optical fibers. The plurality of low voltage communication units are connected in series and disposed in the plurality of power modules, respectively. And the plurality of optical fibers are connected between the low voltage communication units and a master control system of the cascade type power conversion device.

17 Claims, 3 Drawing Sheets

COMMUNICATION SYSTEM FOR CASCADE TYPE POWER CONVERSION DEVICE

CROSS-REFERENCE TO RELATED APPLICATIONS

This non-provisional application claims priority under 35 U.S.C. § 119(a) on Patent Application No. 201710874907.4 filed in P.R. China on Sep. 25, 2017, the entire contents of which are hereby incorporated by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

TECHNICAL FIELD

The present invention relates to a communication system for a cascade type power conversion device, and more particularly, to a communication system capable of reducing the number of optical fibers and transceivers in the cascade type power conversion device.

BACKGROUND ART

FIG. 1 is a structure diagram of an existing communication system for a cascade type power conversion device. As shown in FIG. 1, each phase of the conventional cascade type power conversion device is composed of a plurality of power modules 1a connected in series. Taking a common 6 KV system for example, each phase thereof comprises about 5 to 6 power modules 1a connected in series, and the number of power modules in the three-phase cascade type power conversion device is as many as 15 to 18. And each power module 1a needs to communicate with the master control system 1b of the cascade type power conversion device so that the master control system 1b acquires the output state information of the power modules 1a and controls the power modules 1a. In order to achieve reliable communication and high voltage isolation between the power modules 1a and the master control system 1b, a pair of independent optical fibers are provided between each power module 1a and the master control system 1b. As a result, a large number of optical fibers are used, which causes that the management of the lines is difficult and the production costs increase.

DISCLOSURE OF THE INVENTION

With respect to the above defect in the prior art, a communication system for a cascade type power conversion device is provided. Each phase of the cascade type power conversion device comprises a plurality of power modules connected in series and the communication system.

The communication system comprises a plurality of low voltage communication units connected in series and disposed in the power modules respectively; and a plurality of optical fibers connected between at least one of the low voltage communication units and a master control system of the cascade type power conversion device.

Regarding the above communication system, in each phase, the optical fibers and the low voltage communication units constitute a serial communication loop for communication between the master control system and the power modules.

Regarding the above communication system, the plurality of optical fibers include at least one up-link optical fiber and at least one down-link optical fiber, the master control system transmits a command message and an address of a target power module to the at least one down-link optical fiber, which encodes the command message and the address into a command frame, and the plurality of low voltage communication units receive the command frame and perform decoding and verification so as to transmit the command message to the target power module.

Regarding the above communication system, after the target power module receives the command message from the master control system which asks for reading a status signal of the target power module, the low voltage communication unit of the target power module encodes the status signal so as to transmit it to the up-link optical fiber which then uploads the status signal to the master control system.

Regarding the above communication system, each phase comprises a head-end power module and a tail-end power module; the head-end power module is connected to the master control system via two optical fibers, one of which is the up-link optical fiber and the other of which is the down-link optical fiber; the tail-end power module is connected to the master control system via two optical fibers, one of which is the up-link optical fiber and the other of which is the down-link optical fiber.

Regarding the above communication system, each of the low voltage communication unit includes: a pulse transformer having an output winding and an input winding; a first transmitter connected to the output winding in parallel; and a first receiver connected to the output winding in parallel.

Regarding the above communication system, the pulse transformer further includes a signal winding.

Regarding the above communication system, between two adjacent pulse transformers, the output winding of the preceding one is connected to the input winding of the latter one.

Regarding the above communication system, the command frame including the command message and the address of the target power module is a pulse sequence which is transmitted to the input winding or the output winding of each of the pulse transformers in the phase, and the first receiver of each of the pulse transformers receives the pulse sequence and performs decoding and verification, so as to transmit the command message to the target power module.

Regarding the above communication system, after the target power module receives the command message from the master control system which asks for reading a status signal of the target power module, the first transmitter of the target power module encodes the status signal into another pulse sequence so as to transmit the status signal to the input winding or the output winding, and the input winding or the output winding transmits the pulse sequence to the up-link optical fiber which then uploads it to the master control system.

Regarding the above communication system, each of the low voltage communication unit includes: an optical coupler having an output terminal and an input terminal; a first transmitter connected to the output terminal in parallel; and a first receiver connected to the output terminal in parallel.

Regarding the above communication system, between two adjacent optical couplers, the output terminal of the preceding one is connected to the input terminal of the latter one.

Regarding the above communication system, each phase comprises a head-end power module and a tail-end power module, the head-end power module is connected to the master control system via the up-link optical fiber, and the tail-end power module is connected to the master control system via the down-link optical fiber.

Regarding the above communication system, each of the low voltage communication units further comprises an addressing switch, the master control system transmits an addressing start command to each of the low voltage communication units via the at least one down-link optical fibers, which disconnects the addressing switch of each of the low voltage communication units; the master control system then transmits an addressing command of each of the power modules in sequence via the at least one down-link optical fiber, and the power module performs the corresponding addressing command and transmits an addressed status signal to the master control system via the up-link optical fiber.

Regarding the above communication system, after receiving the addressed status signal from the power module, the master control system then transmits the addressing command of next power module.

Regarding the above communication system, each of the power modules further comprises an auxiliary power supply unit, which is electrically connected to the low voltage communication unit and supplies electric energy for the low voltage communication unit.

Regarding the above communication system, each of the low voltage communication units further comprises a rectifier, which is electrically connected to the signal winding, and the rectifier receives electric energy outputted by the signal winding and supplies electric energy for the low voltage communication unit.

Detailed description is made to the present invention in combination with the drawings and the particular examples, but it is not used as the limitation to the present invention.

EMBODIMENTS

Hereinafter the present invention will be further described in detail with reference to the accompanying drawings and embodiments. The examples were carried out on the premise of the technical solution of the present invention, and the embodiments and operation processes are given. The description and drawings are presented for the purpose of illustration and, as such, are not limitations of the present invention. Thus, those of ordinary skill in the art would readily recognize variations, modification and alternatives. Such variations, modifications, and alternatives should be understood to be also within the scope of the present invention.

Figure 1:
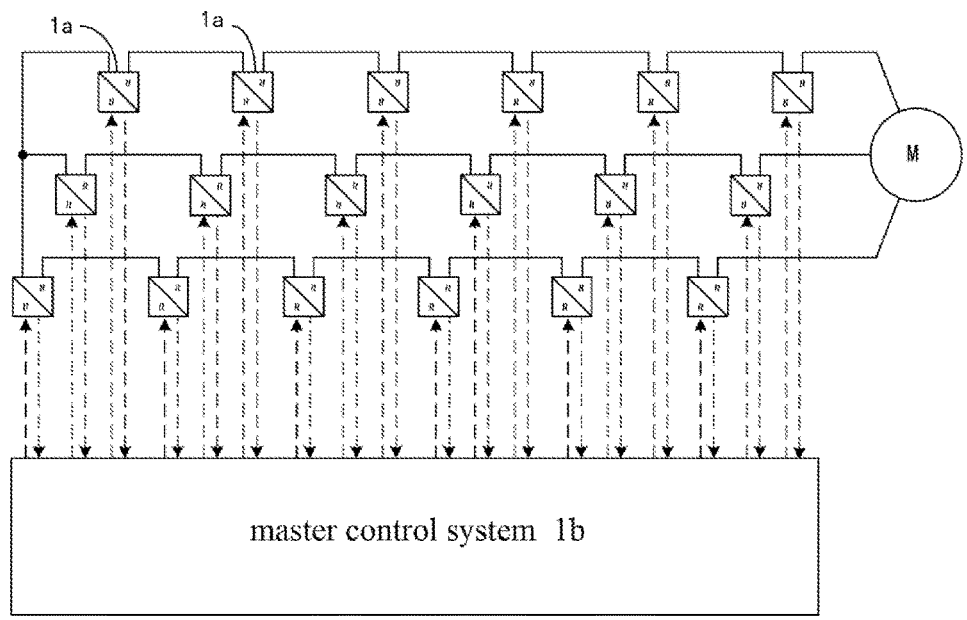
FIG. 1 is a structure diagram of an existing communication system for a cascade type power conversion device.
Figure 2:
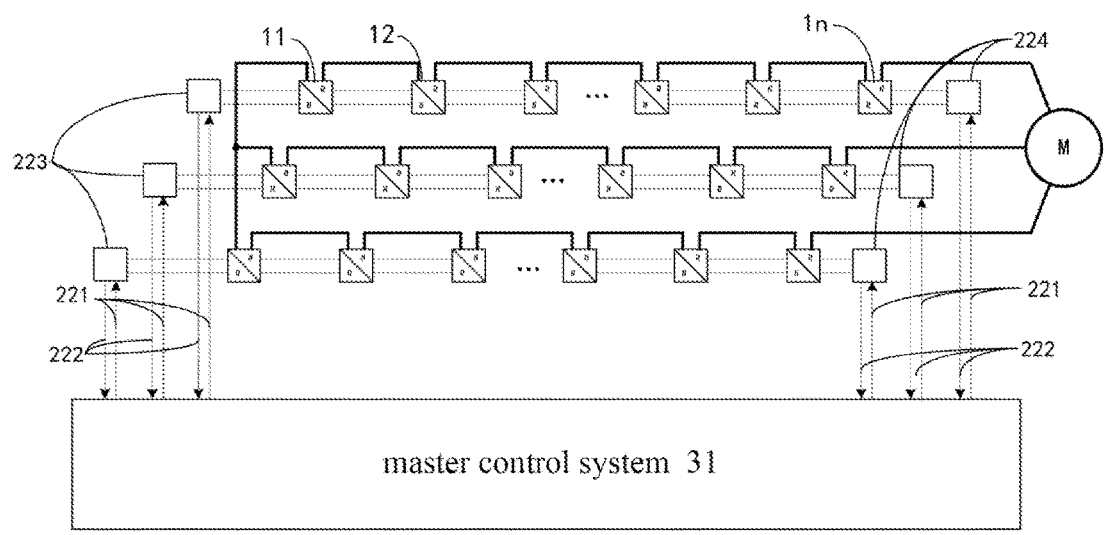
FIG. 2 is a schematic diagram of the communication system of the present invention for a cascade type power conversion device.
Figure 3:
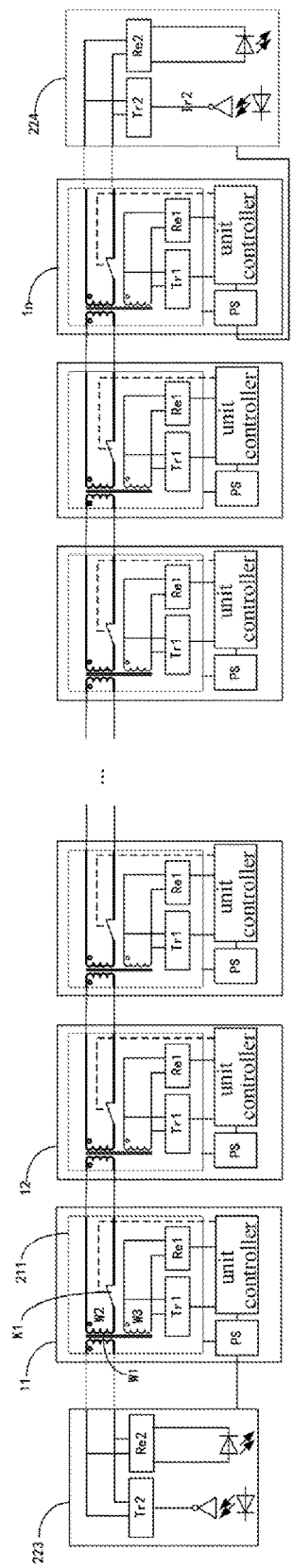
FIG. 3 is a structure diagram of the communication system of the present invention.
Figure 4:
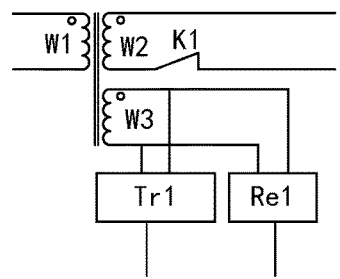
FIG. 4 is a schematic diagram of the first embodiment of the low voltage communication unit of the present invention.

Please referring to FIGS. 2-4, FIG. 2 is a schematic diagram of the communication system of the present invention for a cascade type power conversion device, FIG. 3 is a structure diagram of the communication system of the present invention, and FIG. 4 is a schematic diagram of the first embodiment of the low voltage communication unit of the present invention. As shown in FIGS. 2-4, each phase of the cascade type power conversion device comprises a plurality of power modules 11 to 1$n$ connected in series and a communication system, wherein n is a positive integer. The low voltage communication unit of each power module is disposed on a communication board and integrated within the power module. The voltage among the power modules 11 to 1$n$ connected in series is low, the RMS value of which is 690V. The low voltage communication units can be used to achieve isolation and communication among the power modules, and the optical fibers are only used at the head and the tail of each phase to achieve high-voltage isolation and communication between the phase and the master control system 31.

The communication system includes a plurality of low voltage communication units 211 and a plurality of optical fibers. The plurality of low voltage communication units 211 are disposed in the plurality of power modules 11 to 1$n$ in one to one ratio, and the plurality of low voltage communication units 211 are connected in series. The plurality of optical fibers are used to connect the low voltage communication units 211 to the master control system 31 of the cascade type power conversion device. In each phase, the optical fibers and the low voltage communication units 211 constitute a serial communication loop for communication between the master control system 31 and the power modules.

Further, the serial communication loop includes at least one down-link optical fiber 221 and at least one up-link optical fiber 222. The communication process comprises an uplink communication process and a downlink communication process. In the downlink communication process, the master control system 31 transmits commands to the power modules. The commands can be on or off for a switch, parameter setting of the power module, status reading of the power module and so on. In the uplink communication process, status information of the power modules is uploaded to the master control system 31. The status information can include voltage, temperature, fault and so on. The master control system 31 transmits the commands and the addresses of target power modules to the at least one down-link optical fiber 221 which encodes the commands transmitted, the addresses of the target power modules, and check codes into a command frame. In order to transmit the commands to the target power modules, all of the low voltage communication units 211 in the phase receive the command frame and perform decoding and verification. Finally, the commands are transmitted to one or more of the power modules 11 to 1$n$. Each low voltage communication unit 211 receives the command frame and performs decoding and verification. If there is a check error or the addresses don't match with the power module in which the low voltage communication unit is located, the acquired commands will be discarded. Otherwise, if there is no check error and the addresses match with the power module, the acquired commands are executed by the target power module.

After the target power module receives the command message from the master control system 31 which asks for reading the status signals of the target power module, the low voltage communication unit 211 of the target power module encodes the corresponding status information and transmits it to the up-link optical fiber 222 which uploads the status information to the master control system 31. For example, the master control system 31 requests to read a bus voltage of the power module 12. The down-link optical fiber 221 receives the command message of reading bus voltage transmitted by the master control system. An optical fiber receiver in the down-link optical fiber encodes the command message of reading bus voltage, the address of the power module 12, the check code and so on into the command frame. An optical fiber transmitter transmits the command frame to the low voltage communication units, and all the low voltage communication units 211 of the phase receive the command frame in succession. But only the power module 12 executes the command of reading bus voltage. The low voltage communication unit 211 in the power module 12 encodes the bus voltage, the address of the up-link optical fiber, the check code and other information into another command frame. Because in each phase, the optical fibers and the low voltage communication units constitute the serial communication circuit, the command frame can be received by all the other low voltage communication units 211 of the phase and the up-link optical fiber 222, but only the address of the up-link optical fiber 222 is matched after decoding. Herein, the up-link optical fiber 222 uploads the bus voltage of the power module 12 to the master control system 31.

In this embodiment, each phase comprises a head-end power module 11 and a tail-end power module 1n. The head-end power module 11 is connected to the master control system 31 via two optical fibers each of which further comprises an optical fiber interface board 223. One of the two optical fibers is the up-link optical fiber 222 and the other of the two optical fibers is the down-link optical fiber 221. The tail-end power module 1n is connected to the master control system 31 via two optical fibers, and each of the two optical fibers further comprises an optical fiber interface board 224. One of the two optical fibers is the up-link optical fiber 222 and the other of the two optical fibers is the down-link optical fiber 221. Each of the optical fiber interface boards 223 and 224 comprises a second transmitter Tr2 and a second receiver Re2.

The optical fiber interface board 223 and the two optical fibers connected thereto or the optical fiber interface board 224 and the two optical fibers connected thereto can realize independent transmit-receive communication. The purpose of setting two groups is to ensure that the entire communication loop will not be affected when a single power module is disconnected or a single optical fiber interface board is damaged. Specifically, based on the above-mentioned structure, when the master node optical fiber interface board 223 has a power failure, the optical fiber interface board 224 cannot detect any signal, and the master control system 31 can switch the optical fiber interface board 224 to be the master node to continue communication. When one power module has a power failure, signals can be transmitted uninterruptedly by skipping the low voltage communication unit of the faulted power module, so communication will not be affected. When the optical fiber interface board 223 is the master node, if the signal output line of a low voltage communication unit in one power module is disconnected, the optical fiber interface board 224 cannot detect signal transmission, and then the master control system 31 will switch the optical fiber interface boards 223 and 224 to be the master node. At the disconnection point, the communication system will be divided into two parts which operate separately, to keep on communication. The power modules before the faulted power module and the optical fiber interface board 223 are one part, and the power modules after the faulted power module and the optical fiber interface board 224 are the other part.

The transmitted data can include command messages, status signals, the addresses of power modules and so on. These data spread on a physical network in the form of broadcast, and all the power modules can receive the signals transmitted from the master control system via optical fibers. The optical fiber interface boards and the low voltage communication units in each phase compose a one-master and multi-slave network architecture. The data transmission and reception corresponding to all the power modules are controlled by the master node (the optical fiber interface boards), to multiplex the same transmission line in a time-sharing manner. For example, the transmission order of the command messages or the status signals in the transmission line (the communication system) is set according to the priority order.

Furthermore, each low voltage communication unit 211 includes a pulse transformer, a first transmitter Tr1 and a first receiver Re1. The pulse transformer has an input winding W1, an output winding W2, and a signal winding W3. Between any two adjacent pulse transformers, the output winding W2 of the preceding one is connected to the input winding W1 of the latter one. Both the first transmitter Tr1 and the first receiver Re1 are connected to the signal winding W3 in parallel. The pulse transformer can transmit data in both directions, that is, data can be transmitted from the input winding to the output winding, or data can be transmitted from the output winding to the input winding. The master control system 31 transmits the command messages and the addresses of the target power modules to the down-link optical fiber 221, and the down-link optical fiber 221 encodes the command messages and the addresses into a pulse sequence so as to transmit the pulse sequence to the input winding W1 or the output winding W2 of each pulse transformer. The first receiver Re1 receives the pulse sequence and performs decoding and verification to transmit the command messages to the target power modules. After the target power module receives the command messages from the master control system which asks for reading the status signals of the target power module, the first transmitter Tr1 of the target power module encodes the corresponding status signals and the address of the up-link optical fiber 222 into another pulse sequence so as to transmit the pulse sequence to the input winding W1 or the output winding W2. Then the input winding W1 or the output winding W2 transmits the pulse sequence to the up-link optical fiber 222 which uploads the status signals to the master control system 31. It should be noted that, in each phase, the pulse transformer of each of the low voltage communication units receives the transmitted pulse sequence, but after decoding, the command messages can be executed only when there is no check error and the address is matched. So if there is a check error or the address is not matched, the command messages will be discarded.

Further, each of the low voltage communication units 211 comprises an addressing switch K1 electrically connected to the output winding W2. The master control system 31 transmits an addressing start command to each of the low voltage communication units 211 via the down-link optical fiber 222 so that the addressing switch K1 of each of the low voltage communication units 211 is disconnected. Then the master control system 31 transmits an addressing command of each of the power modules 11 to 1n in sequence via the down-link optical fibers 221, and the power module receives the corresponding addressing command. The addressing switch K1 is closed to perform addressing, and the power module transmits the addressed status signals to the master control system 31 by the up-link optical fibers 222, after the power module finishes addressing. The addressing switch K1 can achieve power-on self-addressing and may be a device with switching function, such as a relay, a transistor, a Mosfet or an IGBT.

It should be noted that, after receiving the addressed status signal from the power module, the master control system 31 transmits the addressing command of next power module.

The specific steps for addressing are as follows. The down-link optical fiber 221 transmits the addressing start command to the low voltage communication units of all the power modules in one phase, and the addressing switches K1 of all the low voltage communication units are disconnected. The down-link optical fiber 221 transmits the addressing command of the power module 11. Since the addressing switches K1 of all the power modules are disconnected, the output windings of all the pulse transformers are disconnected, and only the power module 11 can receive and execute the addressing command. After the power module 11 has completed addressing, it transmits the addressed status signal to the up-link optical fiber 222 and the addressing switch of the power module 11 is closed. Herein, the power module 11 is set to shield the subsequent addressing commands. The down-link optical fiber 221 transmits the addressing command of the power module 12, and at this point both the power modules 11 and 12 can receive the addressing command. But only the power module 12 executes the addressing command because the power module 11 has been set to shield the subsequent addressing commands. After the power module 12 has completed addressing, it transmits the addressed status signal to the up-link optical fiber 222, and the addressing switch of the power module 12 is closed. The power module 12 is set to shield the subsequent addressing commands. The above steps are repeated until the tail-end optical fiber interface board 224 receives the addressing command, which indicates that all the power modules have completed addressing.

Referring to FIG. 3, each of the power modules 11 to 1n further comprises an auxiliary power supply unit PS which is electrically connected to the low voltage communication unit 211 and supplies power for the low voltage communication unit 211. The electric energy required by the optical fiber interface boards 223 and 224 may be provided by the auxiliary power supply units PS in the head-end power module 11 and the tail-end power modules 1n, respectively. In some embodiment, auxiliary circuits may be arranged in the optical fiber interface boards to supply power individually.

Figure 5:
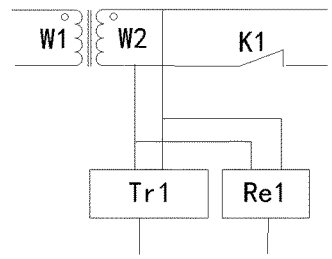
FIG. 5 is a schematic diagram of the second embodiment of the low voltage communication unit of the present invention.

FIG. 5 is a schematic diagram of the second embodiment of the low voltage communication unit in the present invention. As shown in FIG. 5, in this embodiment, the low voltage communication unit 211 includes a pulse transformer, a first transmitter Tr1, and a first receiver Re1. The pulse transformer has an input winding W1 and an output winding W2. The first transmitter Tr1 and the first receiver Re1 are connected to the output winding W2 in parallel. Between any two adjacent pulse transformers, the output winding W2 of the preceding one is connected to the input winding W1 of the latter one. The low voltage communication unit 211 further comprises an addressing switch K1 which is electrically connected to the output winding W2 and is located after the first transmitter Tr1 and the first receiver Re1. In this way, the low voltage communication unit 211 can receive and execute the addressing commands even when the addressing switch K1 is disconnected. In the embodiment, the working process of the low voltage communication unit 211 can refer to the relevant description of the first embodiment shown in FIG. 4, and further explanation is omitted herein for the sake of brevity.

Figure 6:
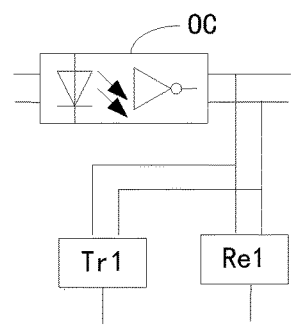
FIG. 6 is a schematic diagram of the third embodiment of the low voltage communication unit of the present invention.

FIG. 6 is a schematic diagram of the third embodiment of the low voltage communication unit in the present invention. As shown in FIG. 6, in this embodiment, each of the low voltage communication units 211 includes an optical coupler OC, a first transmitter Tr1 and a first receiver Re1. The optical coupler OC has an input terminal and an output terminal. The transmitter Tr1 and the first receiver Re1 are connected to the output terminal in parallel. Between any two adjacent optical couplers OC, the output terminal of the preceding one is connected to the input terminal of the latter one. Generally, the optical coupler can only transmit data unidirectionally. That is to say data can only be transmitted from the input terminal to the output terminal. So a down-link optical fiber 221 is disposed at the head end of each phase for transmitting data, and an up-link optical fiber 222 is disposed at the tail end of each phase for receiving data. Data are received and transmitted through the optical fiber interface boards at the head end and the tail end to fulfill serial communication. Specifically, each phase includes a head-end power module 11 and a tail-end power module 1n, wherein the head-end power module 11 is connected to the master control system 31 via the down-link optical fiber 221, and the tail-end power module 1n is connected to the master control system 31 via the up-link optical fiber 222. It is to be noted that, in this embodiment, the power modules 11 to 1n receive signals via the down-link optical fibers 221 and output signals via the up-link optical fibers 222. In the embodiment, the low voltage communication units 211 may further include the addressing switch K1 (not shown in FIG. 6), which is connected to the output terminal of the optical coupler in series. The addressing switch K1 is used for power-on self-addressing. In the embodiment, the working process of the low voltage communication unit 211 is similar with that of the low voltage communication unit 211 shown in FIG. 4, which is not described in detail here.

Figure 7:
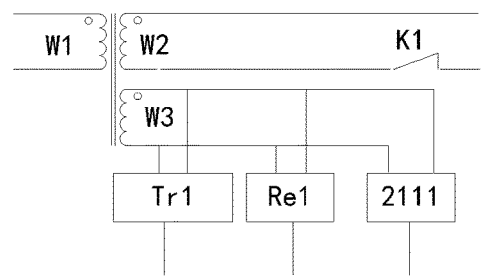
FIG. 7 is a schematic diagram of the fourth embodiment of the low voltage communication unit of the present invention.

FIG. 7 is a schematic diagram of the fourth embodiment of the low voltage communication unit in the present invention. As shown in FIG. 7, in this embodiment, the low voltage communication unit 211 further comprises a rectifier 2111 electrically connected to the signal winding W3. When there are pulses in the transformer, the rectifier 2111 converts the electric energy in the signal winding W3 to supply power for the low voltage communication unit 211.

The present invention also provides a cascade type power conversion device, which comprises a motor M and a control system 31. Each phase of the cascade type power conversion device comprises a plurality of power modules 11 to 1n connected in series and a communication system as described above. The power modules 11 to 1n in each phase are all electrically connected to the motor M, and the power modules 11 to 1n interact with the control system 31 through the communication system.

In the communication system of the present invention, the number of optical fibers can be reduced. For example, there are at most two pairs of optical fibers in each phase. There is only a pair of interconnected lines between adjacent power modules, so the wiring is simplified. The interconnected lines may be the output winding of the transformer or the output line of the optical coupler. And quick-connect terminals can be used for rapid connection of the interconnected lines. The communication and isolation among power modules are achieved by low-cost low voltage communication units which have low cost, so the production costs are reduced. The low voltage communication units may be implemented by pulse transformers and optical couplers, but it is not limited to this. Moreover, when any power module occurs power-failures or disconnections of the connecting lines, since the communication between other power modules and the master control system will not be affected, so the communication system of the present invention has high reliability. Furthermore, the structures of all the low voltage communication units are the same, and it is easy for modularization. The low voltage communication unit can include the addressing switch, which is used for power-on self-addressing.

Throughout the description and drawings, numerous exemplary were given with reference to specific configurations. It will be appreciated by those of ordinary skill in the art that the present invention can be embodied in numerous other specific forms and those of ordinary skill in the art would be able to practice such other embodiments without undue experimentation. The scope of the present invention, for the purpose of the present patent document, is hence not limited merely to the specific exemplary embodiments of the foregoing description, but rather is indicated by the following claims. Any and all modifications that come within the meaning and range of equivalents within the claims are intended to be considered as being embraced within the spirit and scope of the present invention.

What is claimed is:

1. A communication system for a cascade type power conversion device, each phase of the cascade type power conversion device comprising a plurality of power modules connected in series and the communication system, wherein the communication system comprises:
    a plurality of low voltage communication units connected in series and disposed in the power modules respectively; and
    a plurality of optical fibers connected between at least one of the low voltage communication units and a master control system of the cascade type power conversion device.

2. The communication system according to claim 1, wherein in each phase, the optical fibers and the low voltage communication units constitute a serial communication loop for communication between the master control system and the power modules.

3. The communication system according to claim 2, wherein the plurality of optical fibers include at least one up-link optical fiber and at least one down-link optical fiber, the master control system transmits a command message and an address of a target power module to the at least one down-link optical fiber which encodes the command message and the address into a command frame, and the low voltage communication units receive the command frame and perform decoding and verification so as to transmit the command message to the target power module.

4. The communication system according to claim 3, wherein after the target power module receives the command message from the master control system which asks for reading a status signal of the target power module, the low voltage communication unit of the target power module encodes the status signal so as to transmit it to the up-link optical fiber which then uploads the status signal to the master control system.

5. The communication system according to claim 4, wherein each phase comprises a head-end power module and a tail-end power module, the head-end power module is connected to the master control system via two optical fibers, one of which is the up-link optical fiber and the other of which is the down-link optical fiber; and the tail-end power module is connected to the master control system via two optical fibers, one of which is the up-link optical fiber and the other of which is the down-link optical fiber.

6. The communication system according to claim 3, wherein the low voltage communication unit includes:
    a pulse transformer having an output winding and an input winding;
    a first transmitter connected to the output winding in parallel; and
    a first receiver connected to the output winding in parallel.

7. The communication system according to claim 3, wherein the low voltage communication unit includes:
    a pulse transformer having an output winding, an input winding and a signal winding;
    a first transmitter connected to the signal winding in parallel; and
    a first receiver connected to the signal winding in parallel.

8. The communication system according to claim 6, wherein between two adjacent pulse transformers, the output winding of the preceding one is connected to the input winding of the latter one.

9. The communication system according to claim 8, wherein the command frame including the command message and the address of the target power module is a pulse sequence which is transmitted to the input winding or the output winding of each of the pulse transformers in the phase, and the first receiver of each of the pulse transformers receives the pulse sequence and performs decoding and verification, so as to transmit the command message to the target power module.

10. The communication system according to claim 9, wherein after the target power module receives the command message from the master control system which asks for reading a status signal of the target power module, the first transmitter of the target power module encodes the status signal into another pulse sequence so as to transmits the status signal to the input winding or the output winding, and the input winding or the output winding transmits the pulse sequence to the up-link optical fiber which then uploads it to the master control system.

11. The communication system according to claim 4, wherein the low voltage communication unit includes:
    an optical coupler having an output terminal and an input terminal;
    a first transmitter connected to the output terminal in parallel; and
    a first receiver connected to the output terminal in parallel.

12. The communication system according to claim 11, wherein between two adjacent optical couplers, the output terminal of the preceding one is connected to the input terminal of the latter one.

13. The communication system according to claim 12, wherein each phase comprises a head-end power module and a tail-end power module, the head-end power module is connected to the master control system via the up-link optical fiber, and the tail-end power module is connected to the master control system via the down-link optical fiber.

14. The communication system according to claim 3, wherein the low voltage communication unit further comprises an addressing switch, the master control system transmits an addressing start command to each of the low voltage communication units via the at least one down-link optical fiber, which disconnects the addressing switch of each of the low voltage communication units, then the master control system transmits an addressing command of each of the power modules in sequence via the at least one down-link optical fiber, and the power module performs the corresponding addressing command and transmits a addressed status signal to the master control system via the up-link optical fiber.

15. The communication system according to claim 14, wherein after receiving the addressed status signal from the power module, the master control system transmits the addressing command of next power module.

16. The communication system according to claim 1, wherein the power module further comprises an auxiliary power supply unit, which is electrically connected to the low voltage communication unit and supplies electric energy for the low voltage communication unit.

17. The communication system according to claim 7, wherein the low voltage communication unit further comprises a rectifier, which is electrically connected to the signal winding, and the rectifier receives electric energy outputted by the signal winding and supplies power for the low voltage communication unit.

* * * * *